Patented Dec. 28, 1926.

1,611,986

UNITED STATES PATENT OFFICE.

JAMES BADDILEY AND JAMES HILL, OF MANCHESTER, ENGLAND. ASSIGNORS TO BRITISH DYESTUFFS CORPORATION LIMITED, OF MANCHESTER, ENGLAND.

PROCESS FOR THE PRODUCTION OF FAST GREENISH-YELLOW SHADES ON ACETYL SILK.

No Drawing. Application filed May 20, 1925, Serial No. 31,692, and in Great Britain June 20, 1924.

In the year 1900 the production of 1.3-dihydroxy-quinoline was described in the German Patent No. 117167 and in the later German Patent No. 165327, the production of azo dyes by combining this component with diazo compounds was described and claimed. Of these azo dyes the one obtained by combining sulphanilic acid with the dihydroxy-quinoline appears to be the only one that has been manufactured on the commercial scale, for this product was offered on the market for a short time as a special dyestuff for paper under the name "quinazol yellow". Apart from this there is no indication of any dyestuff containing dihydroxy-quinoline having been put upon the market and dihydroxy-quinoline does not appear in the list of intermediate products used in the manufacture of dyestuffs given in the "Colour Index" nor is it mentioned in Shreve's "Dyes, Classified by Intermediates."

There has been for some years an acutely felt want of a dyestuff giving greenish-yellow shades on acetyl silk and numerous unsuccessful attempts have been made to fill this want. All the regular components for yellow azo dyes have been used in attempts to produce a yellow dyestuff for acetyl silk, but some of them do not give the desired greenish-yellow shade, others have insufficient affinity for this peculiar fibre. Others again suffer from a fault known as phototropy. See, for instance, the Journal of the Society of Dyers and Colourists, Vol. XL page 140 where it is stated—"There is almost a plethora of yellow azo dyestuffs for cellulose acetate, yet it was found difficult to find any entirely suitable in other respects, which do not show "phototropy" to a greater or less degree. The greener the shade of yellow, the stronger is the "phototropy" while it vanishes when orange is reached". * * * "A pure greenish-yellow, entirely free from "phototropy" has not yet, however, been obtained."

Again, outside the group of azo dyestuffs, o-chlor-p-nitraniline has been tried as a yellow dyestuff for acetyl silk. This also has the same fault of phototropy, and it is not fast to the action of light and has a tendency to sublime and mark off on to other goods.

We have now found that the monoazo dyes, from aniline and its equivalents, that is to say, its homologues and derivatives including particularly halogenated aniline and toluidines, with 1.3-dihydroxy-quinoline have excellent affinity for acetyl silk, give beautiful lemon-yellow shades on that material, and the dyes are sufficiently fast to light though less so than amino-anthraquinones and are entirely free from the fault of phototropy. In this way a yellow is obtained on acetate silk which is of a greener shade than any that could hitherto be obtained, a surprising technical advantage has been achieved and a use found for the long known substance dihydroxy-quinoline.

The azo compounds from aniline and its derivatives and 1.3-dihydroxy-quinoline can be prepared in the manner described in the said German patents or in the specification of English Patent No. 11205/05 and dyed upon acetyl silk in the usual way for substantially insoluble coloring matter i. e., they may be applied in the form of a plain aqueous suspension or in colloidal form preferably with the assistance of a suitable dispersing agent.

What we claim is—

In the production of fast greenish-yellow shades on acetyl silk, the process which comprises dyeing said acetyl silk with a monoazo dye derived from 1.3-dihydroxyquinoline and an aromatic amine.

In testimony whereof we have hereunto affixed our signatures.

JAMES BADDILEY.
JAMES HILL.